(12) United States Patent
Lung

(10) Patent No.: US 7,215,677 B2
(45) Date of Patent: May 8, 2007

(54) SYSTEM AND METHOD FOR BALANCING LOAD IN A WIRELESS LAN

(75) Inventor: Yi-Jen Lung, Taipei (TW)

(73) Assignee: Institute for Information Industry, Taipei (TW)

( * ) Notice: Subject to any disclaimer, the term of this patent is extended or adjusted under 35 U.S.C. 154(b) by 934 days.

(21) Appl. No.: 10/383,060

(22) Filed: Mar. 7, 2003

(65) Prior Publication Data

US 2004/0095942 A1   May 20, 2004

(30) Foreign Application Priority Data

Nov. 18, 2002  (TW) .............................. 91133660 A

(51) Int. Cl.
*H04L 12/28* (2006.01)

(52) U.S. Cl. ...................... 370/400; 370/465

(58) Field of Classification Search ................ 370/400, 370/465
See application file for complete search history.

(56) References Cited

U.S. PATENT DOCUMENTS

| | | | | |
|---|---|---|---|---|
| 4,621,359 A | * | 11/1986 | McMillen .................... | 370/235 |
| 4,769,810 A | * | 9/1988 | Eckberg et al. ............. | 370/232 |
| 5,053,950 A | * | 10/1991 | Naganuma et al. ......... | 718/105 |
| 5,128,932 A | * | 7/1992 | Li ............................... | 370/236 |
| 5,495,426 A | * | 2/1996 | Waclawsky et al. ........ | 709/226 |
| 5,742,587 A | * | 4/1998 | Zornig et al. ............... | 370/235 |
| 5,978,844 A | * | 11/1999 | Tsuchiya et al. ............ | 709/221 |
| 6,097,705 A | * | 8/2000 | Ben-Michael et al. ...... | 370/315 |
| 6,473,403 B1 | * | 10/2002 | Bare .......................... | 370/236 |
| 6,704,293 B1 | * | 3/2004 | Larsson et al. ............. | 370/255 |
| 7,085,234 B2 | * | 8/2006 | Kimball et al. ............. | 370/235 |

* cited by examiner

*Primary Examiner*—Doris H. To
*Assistant Examiner*—Phuongchau Ba Nguyen
(74) *Attorney, Agent, or Firm*—Bacon & Thomas, PLLC

(57) ABSTRACT

System and method for balancing load among access points in a LAN are disclosed. Each access point has a SSID. After resetting an access point, the access point entering a SSID hidden state for hiding its SSID so as to prohibit mobile stations from accessing the access point. When in the SSID hidden state, an access point enters into a SSID showing state for showing its SSID and for enabling mobile stations to couple to the access point if no show-SSID-rejection frame is received. When in the SSID showing state, an access point enters into a SSID pre-hiding state for showing its SSID if the show-SSID-rejection frame is received. When in the SSID pre-hiding state, an access point enters into the SSID hidden state if the show-SSID-rejection frame is received, otherwise the first access point entering into the SSID showing state.

5 Claims, 5 Drawing Sheets

ABSTRACT

SYSTEM AND METHOD FOR BALANCING LOAD IN A WIRELESS LAN

BACKGROUND OF THE INVENTION

1. Field of the Invention

The present invention relates to load balance in a wireless local area network (LAN) and, more particularly, to a system and a method for balancing load among access points in a wireless LAN.

2. Description of Related Art

Wireless communication has known a rapid, spectacular development leading to an increasing popularity of wireless LAN. FIG. 1 presents schematically a well-known wireless LAN structure. As shown in the FIG. 1, the wireless LAN is comprised of a plurality of mobile stations (e.g., Personal Digital Assistants (PDAs)) 13 and access points 10, 11, in which the provision of the additional access point 11 is for serving increased users coupled to the wireless LAN. The access points 10 and, 11 form a group for servicing the mobile stations 13 in the controlled area of the access points 10 and 11. Also, an Ethernet 12 is interconnected the access points 10 and 11. The Ethernet 12 may be further coupled to the Internet to form a wide area network (WAN). As such, for example, one mobile station 13 associated with the access point 10 not only may communicate with the other mobile station over the wireless LAN but also may be coupled to the Internet at any time.

However, load may be out of balance among access points due to roaming or other factors. For example, if three mobile stations 13 are coupled to the access point 10 while only one mobile station 13 is coupled to the access point 11, a new mobile station 13 coupled to the access point 10 may increase the load borne on the access point 10, thus causing an out of balance condition between these two access points 10 and 11. Such out of balance condition can lower the overall performance of the wireless LAN.

Therefore, it is desirable to provide novel system and method for balancing load among access points in a wireless LAN in order to mitigate and/or obviate the aforementioned problem.

SUMMARY OF THE INVENTION

The object of the present invention is to provide system and method for effectively balancing load among access points in a wireless LAN so as to increase the overall performance.

In one aspect of the present invention there is provided a method for balancing load in a wireless local area network having a plurality of access points for servicing mobile stations under control. Each access point has a unique Service Set Identifier (SSID), and broadcasts a load frame indicating its load to the other access points in every predetermined period of time. When a first access point receives a load frame from a second access point indicating that the load of the second access point is larger than that of the first access point, the first access point issues a show-SSID-rejection frame to the second access point. The method comprises the steps of: (A) after resetting an access point, the access point entering a SSID hidden state for hiding its SSID so as to prohibit mobile stations from accessing the access point; (B) when in the SSID hidden state, an access point entering into a SSID showing state for showing its SSID and for enabling mobile stations to couple to the access point if no show-SSID-rejection frame is received; (C) when in the SSID showing state, an access point entering into a SSID pre-hiding state for showing its SSID if the show-SSID-rejection frame is received; and (D) when in the SSID pre-hiding state, an access point entering into the SSID hidden state if the show-SSID-rejection frame is received, otherwise the access point entering into the SSID showing state.

In another aspect of the present invention there is provided a system for balancing load in a wireless local area network, which comprises a plurality of access points for servicing mobile stations under control, and a distributed system provided as a transmitting medium among the plurality of access points. Each access point has a unique Service Set Identifier (SSID), and broadcasts a load frame indicating its load to the other access points in every predetermined period of time. When a first access point receives a load frame from a second access point indicating that the load of the second access point is larger than that of the first access point, the first access point issuing a show-SSID-rejection frame to the second access point. After resetting an access point, the access point enters a SSID hidden state for hiding its SSID so as to prohibit mobile stations from accessing the access point. When in the SSID hidden state, an access point enters into a SSID showing state for showing its SSID and for enabling mobile stations to couple to the access point if no show-SSID-rejection frame is received. When in the SSID showing state, an access point enters into a SSID pre-hiding state for showing its SSID if the show-SSID-rejection frame is received. When in the SSID pre-hiding state, an access point enters into the SSID hidden state if the show-SSID-rejection frame is received, otherwise the access point enters into the SSID showing state.

Other objects, advantages, and novel features of the invention will become more apparent from the detailed description when taken in conjunction with the accompanying drawings.

DETAILED DESCRIPTION OF THE PREFERRED EMBODIMENT

Figure 1:
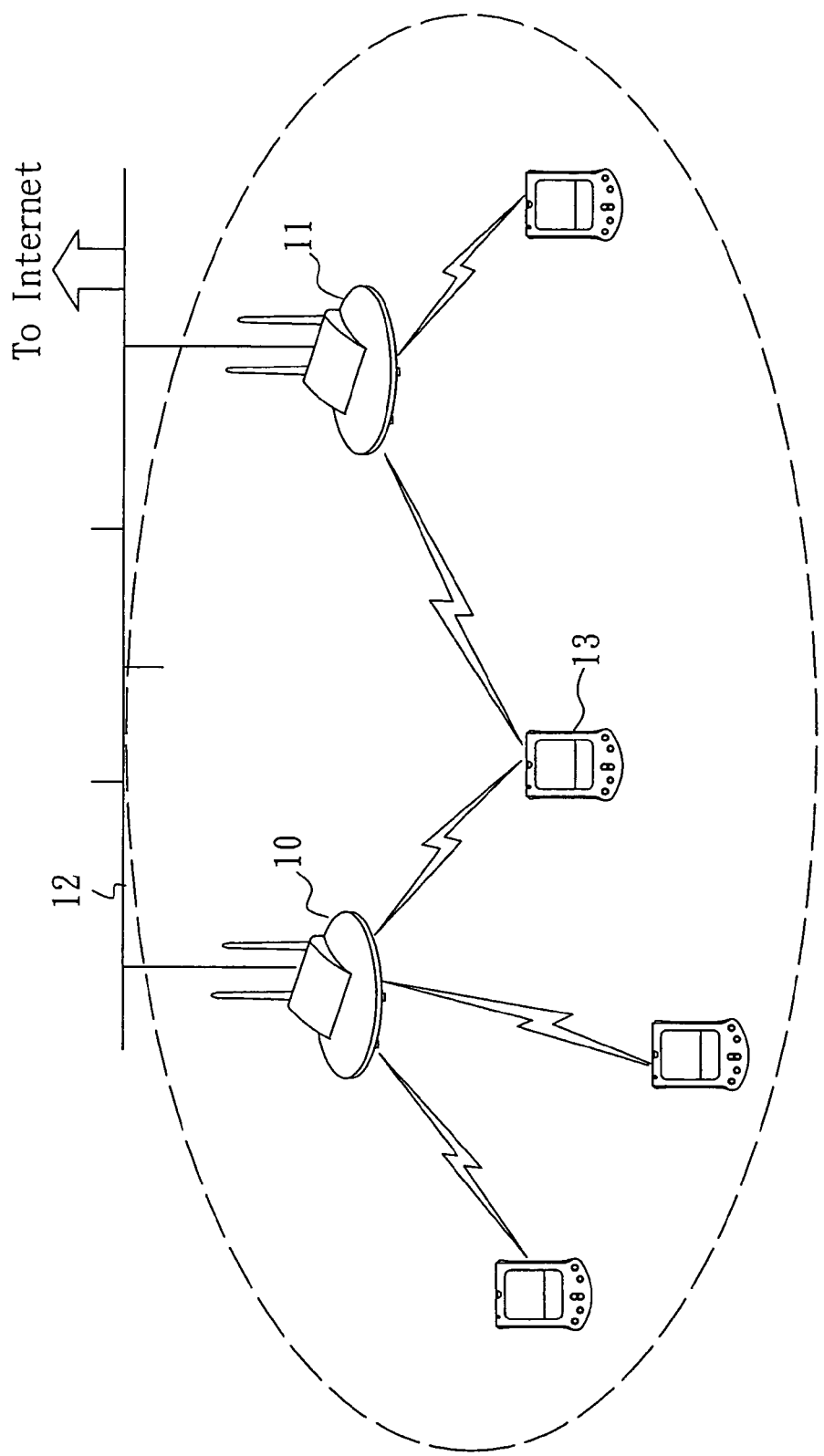
FIG. 1 presents schematically the connection of mobile stations to one of access points in a well-known wireless LAN.
Figure 2:
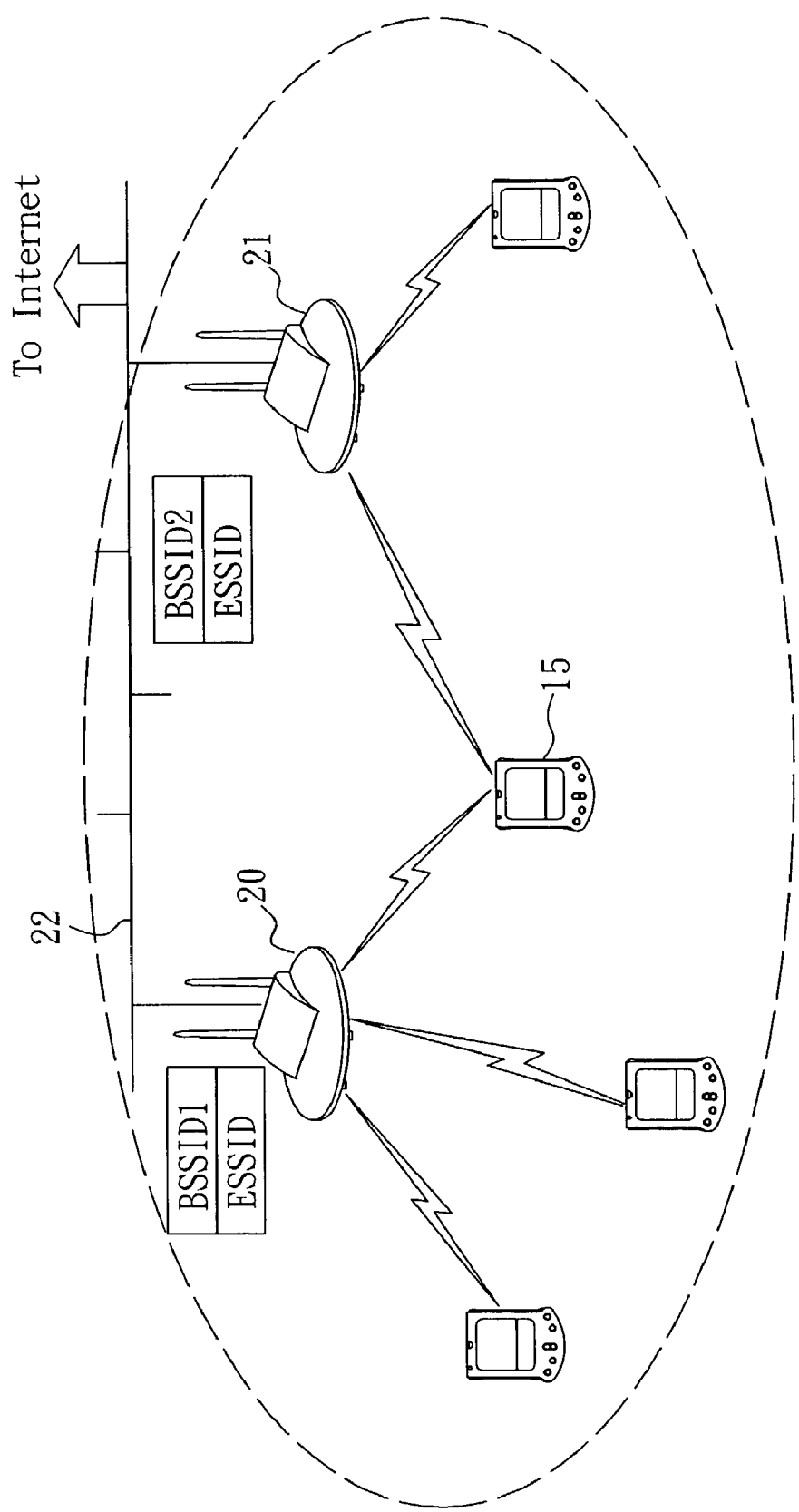
FIG. 2 presents schematically the connection of mobile stations to one of access points in a wireless LAN according to the invention.

With reference to FIG. 2, there is shown a system for balancing load in a wireless LAN in accordance with the present invention. As shown, a group is comprised of a plurality of access points. For ease of description, only two access points 20, 21 in the group are shown, while it is appreciated by those skilled in the art that there may be more than two access points in a group in any of other embodiments without departing from the scope and spirit of the invention. Each access point has a unique Service Set Identifier (SSID) for serving a plurality of mobile stations coupled thereto. The access point may broadcast or receive frames via a distributed system 22. In the embodiment, the distributed system 22 is an 802.3 Ethernet.

Figure 3:
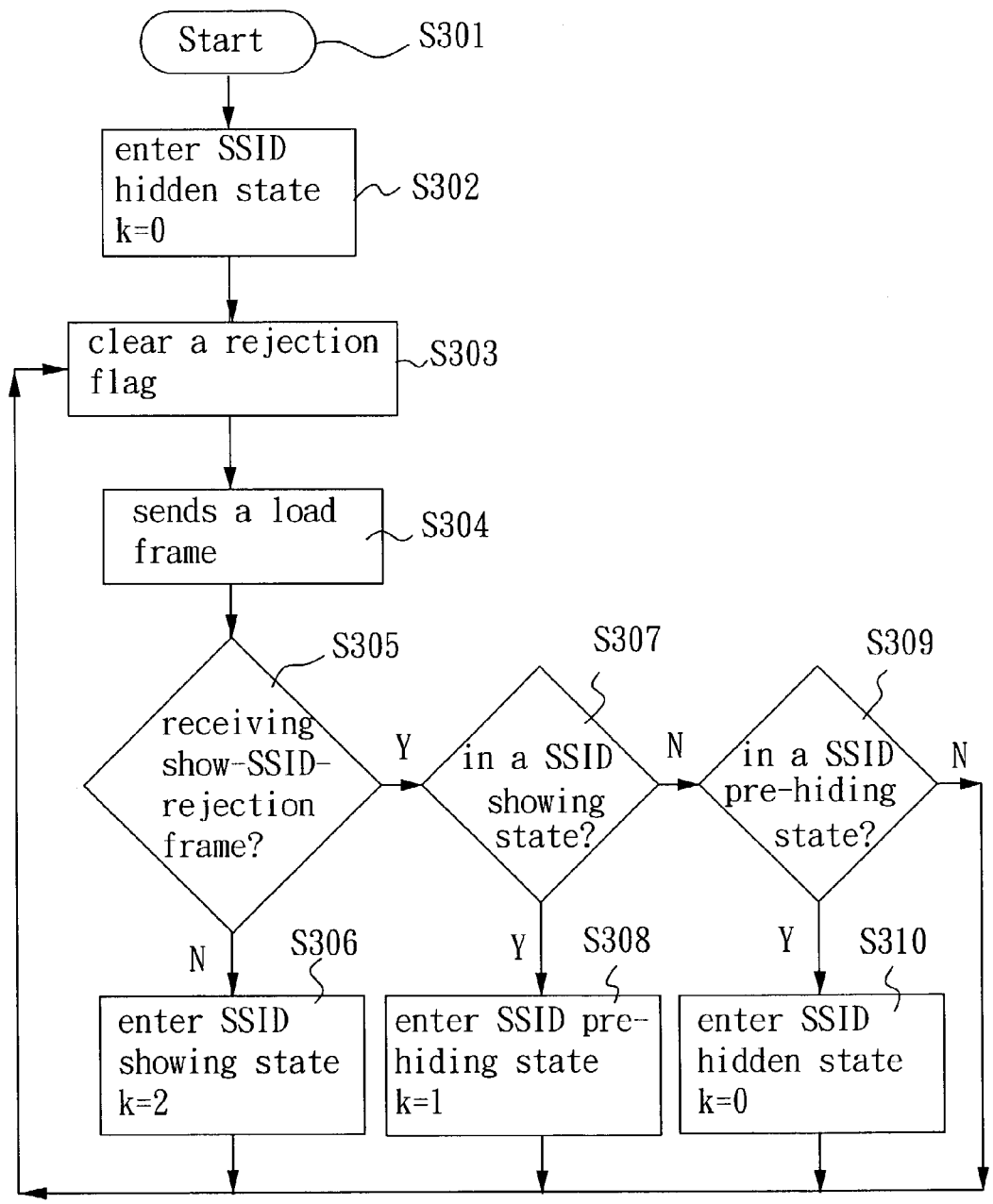
FIG. 3 is a flow chart illustrating a process according to a preferred embodiment of the invention.

With reference to FIG. 3, there is shown a flow chart illustrating a load balance process according to a preferred embodiment of the present invention. Steps of the process will now be described in detail below. In step S302, after being reset, the access point enters into a SSID hidden state (with a state value k equal to 0) in which its SSID is hidden for prohibiting mobile stations from accessing the access point. In detail, the SSID is hidden in a beacon frame sent by the access point. Alternatively, the access point does not response to a Probe Request issued by a mobile station in an active probe mode. As such, either association nor re-association cannot be performed by the mobile station by utilizing the SSID of the access point, resulting in a prohibition of providing services to the mobile station by the access point.

In step S303, a rejection flag in the access point is cleared. The flag is used to show whether a show-SSID-rejection frame has been received. The show-SSID-rejection frame is sent from the other access point over the distributed system 22. In step S304, the access point continuously sends a load frame to other access points over the distributed system 22 in every regular period of time.

Figure 4A:
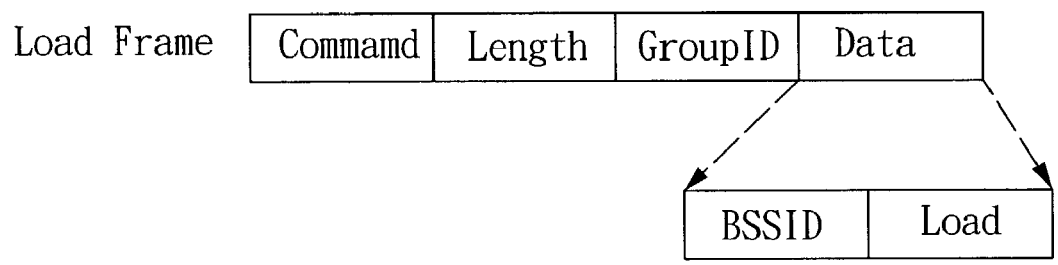
FIGS. 4A and 4B show schematically a load frame and a show-SSID-rejection frame of the invention respectively.

The load frame is shown in FIG. 4A. In the embodiment, the load frame is a broadcast frame which is comprised of a command field for storing a command of load balance, a length field, a GroupID field for storing different load balance strategies for calculating load on the access point, and a data field. The load balance strategies are classified for calculating the number of users accessing the access point, calculating throughput of the access point, and calculating transmission quality of the access point. The data field consisting of a BSSID sub-field for showing the access point which sends the load frame and a load sub-field for showing load of the access point.

In step S305, the access point determines whether a show-SSID-rejection frame sent from the other access point over the distributed system 22 has been received. If the access point is in the SSID hidden state and has not received a show-SSID-rejection frame, it should enter the SSID showing state (k=2) (step S306). Otherwise, the access point should further perform a state determination (step S307).

Figure 4B:
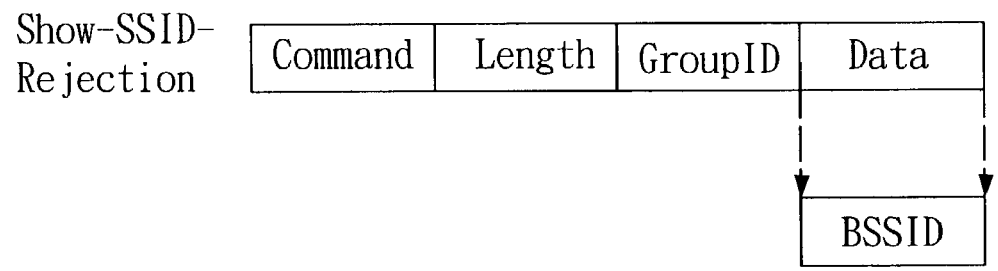

The format of the show-SSID-rejection frame is shown in FIG. 4B. In this embodiment, the show-SSID-rejection frame is a Unicast frame which is comprised of a command field for storing a command of show-SSID-rejection frame, a length field, a GroupID field for storing different load balance strategies for calculating load on the access point same as that of the load frame, and a data field consisting of only a SSID sub-field for showing the access point which sends the show-SSID-rejection frame.

The other access point may compare its load with the load recorded in a load frame sending from the access point. If the load on the other access point is lower than that on the access point a show-SSID-rejection frame will be issued to the access point by the other access point; otherwise, no action will be taken.

In step S306, the access point enters a SSID showing state (with the state value k equal to 2) for showing the SSID. Further, the mobile station may utilize the SSID in the beacon frame or probe response to couple to the access point for communicating with any mobile station.

In step S307, it is determined whether the access point is in a SSID showing state. If yes, the process goes to step S308, and the access point enters a SSID pre-hiding state (with the state value k equal to 1) and shows its SSID before looping back to step S303. Otherwise, the process jumps to step S309 for further performing state determination.

In step S309, it is determined whether the access point is in a SSID pre-hiding state (k=1). If yes, the process goes to step S310 for causing the access point to enter a SSID hidden state (with the state value k equal to 0) in which the SSID is hidden. Otherwise, no action is taken.

Figure 5:
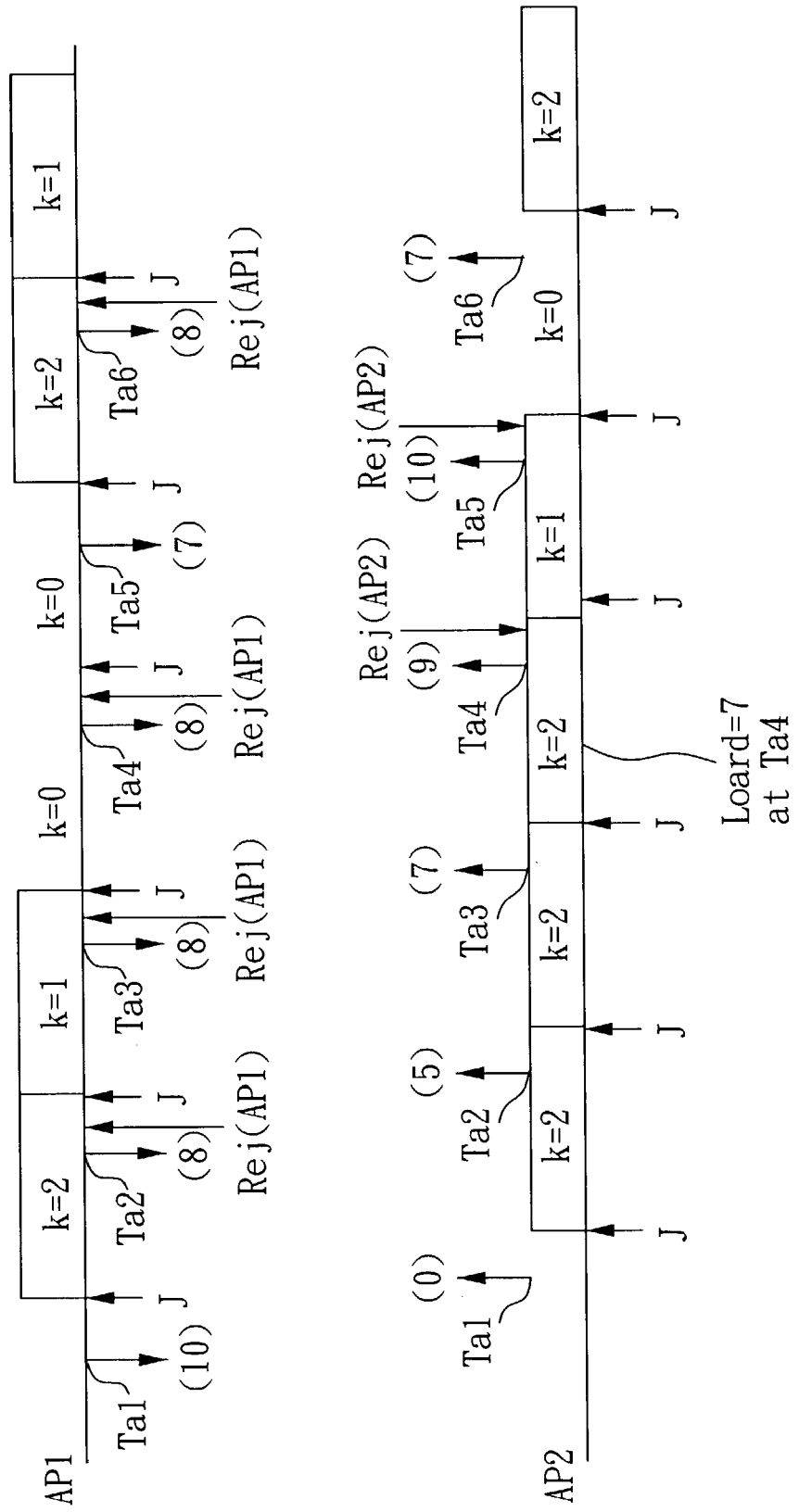
FIG. 5 shows schematically a state transition for two access points according to the invention.

With reference to FIG. 5, there is shown a state transition diagram for two access points. Character "J" under arrow means a time point of state transition of the access point. Numeral (e.g., 10) between two parentheses at the tip of arrow means that the access point has sent a load frame with a load of that value (e.g., 10). Rej(APX) at the shaft of arrow means the access point X (e.g., X=1 or 2 in this embodiment) has received a show-SSID-rejection frame. At time point Ta1, the second access point (AP2) is not activated, and after the first access point has sent a load frame with load of 10, a show-SSID-rejection frame is still not received by the first access point. Hence, the first access point is still in a SSID showing state (with the state value k equal to 2). At time point Tb1, a connection to a second access point has been established. At the same time, a load frame with load of 0 is sent from the second access point. The first access point will not issue a show-SSID-rejection frame since its load is larger than that of the second access point. At time point Ta2, after the first access point has sent a load frame with load of 8, a show-SSID-rejection frame Rej(AP1) will be issued by the second access point because load of the first access point is larger than that of the second access point. As such, the first access point enters the SSID pre-hiding state (with the state value k equal to 1). At time point Tb2, its processing is the same as that at time point Tb1 in which the second access point is in a SSID showing state (with the state value k equal to 2).

At time point Ta3, after the first access point has sent a load frame with load of 8, a show-SSID-rejection frame Rej(AP1) will be issued by the second access point because load of the first access point is larger than load (e.g., 7) of the second access point. As such, the first access point enters into a SSID hidden state (with the state value k equal to 0). At time point Tb3, its processing is the same as that at time point Tb1 in which the second access point is in a SSID showing state (with the state value k equal to 2).

At time point Ta4, after the first access point has sent a load frame with load of 8, a show-SSID-rejection frame Rej(AP1) will be issued by the second access point because load of the first access point is larger than load (e.g., 7) of the second access point. As such, the first access point is still in the SSID hidden state (with the state value k equal to 0). At time point Tb4, after the second access point has sent a load frame with load of 9, a show-SSID-rejection frame Rej(AP2) will be issued by the first access point because load of the second access point is larger than load (e.g., 8) of the first access point. As such, the second access point enters into the SSID pre-hiding state (with the state value k equal to 1).

At time point Ta5, after the first access point has sent a load frame with load of 7, a show-SSID-rejection frame Rej(AP1) will not be issued by the second access point because load of the first access point is smaller than load (e.g., 10) of the second access point. As such, the first access point enters into the SSID showing state (with the state value k equal to 2). At time point Tb5, after the second access point has sent a load frame with load of 10, a show-SSID-rejection frame Rej(AP2) will be issued by the first access point because load of the second access point is larger than load (e.g., 7) of the first access point. As such, the second access point enters into the SSID hidden state (with the state value k equal to 0).

At time point Ta6, after the first access point has sent a load frame with load of 8, a show-SSID-rejection frame Rej(AP1) will be issued by the second access point because load of the first access point is larger than load (e.g., 7) of the second access point. As such, the first access point enters into a SSID pre-hiding state with the state value k equal to 1. At time point Tb6, after the second access point has sent a load frame with load of 7, a show-SSID-rejection frame will not be issued by the first access point because load of the second access point is smaller than load (e.g., 8) of the first access point. As such, the second access point enters into a SSID showing state (with the state value k equal to 2).

In brief, in the wireless LAN with the provision of SSID pre-hiding state (state value k is equal to 1), it can prevent all of the access points from entering into a SSID hidden state (with the state value k equal to 0). As a result, any mobile station is able to couple to the access point for accessing the wireless LAN. Moreover, all load calculations and controls are performed at the access point without involving the mobile station. Accordingly, the purpose of balancing load among the access points in the wireless LAN can be achieved by the system and method of the present invention.

Although the present invention has been explained in relation to its preferred embodiment, it is to be understood that many other possible modifications and variations can be made without departing from the spirit and scope of the invention as hereinafter claimed.

What is claimed is:

1. A method for balancing load in a wireless local area network having a plurality of access points for servicing mobile stations under control, each access point having a unique Service Set Identifier (SSID), and broadcasting a load frame indicating its load to the other access points in every predetermined period of time, when a first access point receives a load frame from a second access point indicating that the load of the second access point is larger than that of the first access point, the first access point issuing a show-SSID-rejection frame to the second access point, the method comprising the steps of:
   (A) after resetting an access point, the access point entering a SSID hidden state for hiding its SSID so as to prohibit mobile stations from accessing the access point;
   (B) when in the SSID hidden state, an access point entering into a SSID showing state for showing its SSID and for enabling mobile stations to couple to the access point if no show-SSID-rejection frame is received;
   (C) when in the SSID showing state, an access point entering into a SSID pre-hiding state for showing its SSID if the show-SSID-rejection frame is received; and
   (D) when in the SSID pre-hiding state, an access point entering into the SSID hidden state if the show-SSID-rejection frame is received, otherwise the access point entering into the SSID showing state.

2. The method as claimed in claim 1, wherein the access points broadcast the load frame or receive the show-SSID-rejection frame via a distributed system.

3. The method as claimed in claim 2, wherein the distributed system is an 802.3 Ethernet.

4. A system for balancing load in a wireless local area network comprising:
   a plurality of access points for servicing mobile stations under control, each access point having a unique Service Set Identifier (SSID), and broadcasting a load frame indicating its load to the other access points in every predetermined period of time, when a first access point receives a load frame from a second access point indicating that the load of the second access point is larger than that of the first access point, the first access point issuing a show-SSID-rejection frame to the second access point; and
   a distributed system provided as a transmitting medium among the plurality of access points for transferring packets among the plurality of access points; and
   wherein, after resetting an access point, the access point enters a SSID hidden state for hiding its SSID so as to prohibit mobile stations from accessing the access point; when in the SSID hidden state, an access point enters into a SSID showing state for showing its SSID and for enabling mobile stations to couple to the access point if no show-SSID-rejection frame is received; when in the SSID showing state, an access point enters into a SSID pre-hiding state for showing its SSID if the show-SSID-rejection frame is received; and when in the SSID pre-hiding state, an access point enters into the SSID hidden state if the show-SSID-rejection frame is received, otherwise the access point enters into the SSID showing state.

5. The system as claimed in claim 4, wherein the distributed system is an 802.3 Ethernet.

* * * * *